United States Patent [19]
Nakajima

[11] Patent Number: 5,995,072
[45] Date of Patent: Nov. 30, 1999

[54] VIDEO SIGNAL PROCESSOR WHICH SEPARATES VIDEO SIGNALS WRITTEN TO A LIQUID CRYSTAL DISPLAY PANEL

[75] Inventor: Yoshiharu Nakajima, Kanagawa, Japan

[73] Assignee: Sony Corporation, Tokyo, Japan

[21] Appl. No.: 08/706,226

[22] Filed: Sep. 4, 1996

[30] Foreign Application Priority Data

Sep. 7, 1995 [JP] Japan ............................... P07-230408

[51] Int. Cl.$^6$ .............................. G09G 3/36; G09G 5/00
[52] U.S. Cl. ........................... 345/87; 345/204; 348/790
[58] Field of Search .................................. 345/87, 94, 95, 345/96, 98, 99, 100, 204, 205, 206; 348/790, 792

[56] References Cited

U.S. PATENT DOCUMENTS

| | | | |
|---|---|---|---|
| 4,642,628 | 2/1987 | Murata | 345/98 |
| 5,192,945 | 3/1993 | Kusada | 345/100 |
| 5,287,095 | 2/1994 | Kitazima et al. | |
| 5,418,547 | 5/1995 | Mizukata et al. | 345/98 |
| 5,510,807 | 4/1996 | Lee et al. | 345/208 |
| 5,670,970 | 9/1997 | Yamazaki | 345/96 |
| 5,682,175 | 10/1997 | Kitamura | 345/100 |
| 5,726,676 | 3/1998 | Callaham, Jr. et al. | 345/204 |
| 5,745,093 | 4/1998 | Tsuzuki et al. | 345/208 |
| 5,784,073 | 7/1998 | Yamazaki et al. | 345/92 |

FOREIGN PATENT DOCUMENTS

| | | |
|---|---|---|
| 0 438 927 | 7/1991 | European Pat. Off. |
| 0 457 329 | 11/1991 | European Pat. Off. |
| 2 155 221 | 9/1985 | United Kingdom. |

OTHER PUBLICATIONS

Patent Abstracts of Japan No. 07129125 dated May 19, 1995.
Patent Abstracts of Japan No. 06295162 dated Oct. 21, 1994.
Patent Abstracts of Japan No. 04034592 dated Feb. 5, 1992.
Patent Abstracts of Japan No. 05219461 dated Aug. 27, 1993.
Patent Abstracts of Japan No. 05064113 dated Mar. 12, 1993.
Patent Abstracts of Japan No. 03266578 dated Nov. 27, 1991.
Patent Abstracts of Japan No. 05210361 dated Aug. 20, 1993.
Patent Abstracts of Japan No. 03287921 dated Dec. 17, 1991.

*Primary Examiner*—Jeffery Brier
*Assistant Examiner*—Paul A Bell
*Attorney, Agent, or Firm*—Hill & Simpson

[57] ABSTRACT

A video signal processing apparatus chiefly has a peripheral circuit, a low-voltage processing circuit for controlling image quality, a high-voltage processing circuits for converting into a signal for a liquid crystal display panel, and the liquid crystal display panel. Signal separation is performed in two stages, in the low-voltage processing circuit and the high-voltage processing circuits. The frequency characteristics of the low-voltage processing circuit are enhanced by decreasing the number of the separated sections thereof to two, while the frequency characteristics of the high-voltage processing circuits are suppressed by increasing the number of the separated sections thereof to twelve, and sufficient voltages therefor are provided.

10 Claims, 9 Drawing Sheets

VIDEO SIGNAL PROCESSOR WHICH SEPARATES VIDEO SIGNALS WRITTEN TO A LIQUID CRYSTAL DISPLAY PANEL

BACKGROUND OF THE INVENTION

1. Field of the Invention

This invention generally relates to video signal processing apparatuses that drive liquid crystal display panels used in, for example, camcorders and liquid crystal projectors. In particular, this invention relates to a video signal processing apparatus in which circuits for processing video signals are separated in order to reduce both the size of the circuits and power consumption when a video signal is written into a liquid crystal panel.

2. Description of the Related Art

Recently, with the spread of equipment using liquid crystal display panels represented by camcorders and liquid crystal projectors, it is demanded that such liquid crystal display panels have higher performance. Accordingly, measures for the higher resolution and enhanced image quality of the liquid crystal display panel have been proceeding. For driving the liquid crystal display panels, in general, the following two methods are employed:

First, the point sequential sampling method is employed in thin film transistors, in particular, those having an active layer made from polycrystalline silicon, because of rapid response thereof. In this method a video signal corresponding to one pixel is written in a short period by using one signal line.

Second, the so-called plural-dot simultaneous sampling method and the so-called line sequential method are employed in liquid crystal display panels having enhanced resolution. In this method, signals are separated into a predetermined number of signals before a driving process is performed, and all the separated signals are simultaneously written in the panel.

Among these driving methods, the first point sequential sampling method is preferred, when viewed from the point of the simplification of the circuit. However, when high resolution is enhanced by increasing the number of pixels of the liquid crystal display panel, the video signal processing apparatus needs to have a broader frequency band. As a result, employing the point sequential sampling method becomes difficult. By way of example, in order to process high definition television signals whose speed is doubled, and XGA signals for computers, luminous signals need to have a frequency band higher than 40 MHz. It is, at present, extremely difficult to produce a video signal processing apparatus having such a frequency band. This is because a digital signal processor having a system clock of 80 MHz to cover the above frequency band can be realized but considerable power consumption is required therefor.

In connection with a high-voltage processing circuit intended for the interface with the liquid crystal display panel, this circuit is extremely difficult to realize because there is not a large-scale integrated circuit adapted therefor. Further, it is presently impossible to form a processing circuit having the above frequency band on the liquid crystal display panel in which polycrystal silicon is used. Consequently, in a video signal processing apparatus having a high-resolution liquid crystal display panel, only the plural dot simultaneous sampling method or the line sequential method can be employed. The present invention is concerned with this video signal processing apparatus having a high-resolution liquid crystal display panel. By referring to embodiments thereof, the present invention will be described below.

By referring to FIGS. 7 to 9, video signal processing apparatuses employing the point sequential sampling method will be described.

First, by referring to FIG. 7, a first example of a video signal processing apparatus will be described in connection with a configuration thereof. FIG. 7 is a block diagram showing a video signal processing apparatus employing the point sequential sampling method. Constituent elements are partly shown by abbreviations such as "TG", "AMP", "BUFF", and "SW".

The video signal processing apparatus employing the point sequential sampling method chiefly has a peripheral circuit 1 for handling an input video signal, a low-voltage processing circuit 2 in which processing that includes controlling image quality is performed in low-voltage circuit portions thereof, a liquid crystal panel 4, and a high-voltage processing circuit 3 for converting into signals for the liquid crystal panel.

The peripheral circuit 1 has an input terminal 5 to which video signals such as composite video signals are inputted, a decoder 6 for converting the input video signals into separate signals, R, G, and B signals (in the case of color liquid crystal panel), and a timing generator 7 for generating various control signals. The low-voltage processing circuit 2 includes a brightness controller 8 provided with control means, which is not shown, for controlling brightness, a contrast controller 9, a gamma corrector 10, an inverting amplifier 11, and a polarity switch 12.

The high-voltage processing circuit 3 includes an AC amplifier 13 and a buffer 14. The liquid crystal display panel 4 includes an H-scanner 15 including gate circuits and sample-and-hold circuits, a V-scanner 16 including enable gates and buffers. The H-scanner 15 is connected to signal lines as described below through switching devices 17, while the V-scanner 16 is connected to scanning lines (not shown). Thin film transistors (TFTs) are formed on the points where the signal lines and the scanning lines intersect with each other, which transistors form a display area 18.

The operation of the first example of the video signal processing apparatus having such a structure will be described.

A video signal such as a composite video signal inputted to the input terminal 5 in the peripheral circuit 1 in FIG. 7 is inputted to the decoder 6. The decoder 6 converts the signal into separate signals such as R, G, and B signals adapted for driving the liquid crystal display panel, and outputs synchronizing signals Hsync and Vsync to the timing generator 7. The timing generator 7 generates various control signals for controlling the liquid crystal display panel using a voltage-controlled oscillator (VCO) and synchronizing signals Hsync and Vsync, and outputs them to the low-voltage processing circuit 2 and the liquid crystal display panel 4. As examples of these control signals, sampling pulses SP necessary for sampling video signals, inversion pulses FRP for converting the video signals into AC signals, start pulses HST and VST for the H-scanner 15 and the V-scanner 16, clock pulses VCK and HCK, and so forth are given.

By controlling control means, as not shown, of the brightness controller 8, the contrast controller 9, and the gamma corrector 10 in the low-voltage processing circuit 2, brightness, contrast, and a gamma correction curve are controlled, respectively. The inverting amplifier 11 and the polarity switch 12 convert the video signals into AC signals, being synchronized with the inversion pulses FRP, so that the polarity switch 12 outputs video signals having predetermined polarities.

The AC amplifier 13 in the high-voltage processing circuit 3 amplifies the AC-converted video signals up to a predetermined image level. In connection with the resulting signals, processing including electric current amplification is performed in the buffer 14, in order to drive the load of the liquid crystal display panel 4.

The liquid crystal display panel 4 receives the video signals inputted from the above-described video signal processing apparatus and the control signals HST, HCK, VST, and VCK, and supplies them to the H-scanner 15 and the V-scanner 16. The V-scanner 16 sequentially selects one of the scanning lines every one horizontal period, while the H-scanner 15 sequentially selects one of the switching devices 17 every one horizontal period. The video signals are taken in the signal lines through the switching devices 17. The video signals taken in the lines control the liquid crystal molecules (not shown) using TFTs as described below so that the molecules are twisted to be tilted in the direction of a voltage to be applied, thereby an image is displayed on the display area 18. In accordance with such a driving circuit employing the point sequential sampling method, it is only a requirement that, with respect to one video signal, one signal line is connected to the last analog switch, which thus causes the extremely reduced size of the circuits.

By referring further to FIG. 8, a second example of a conventional video signal processing apparatus will be described.

FIG. 8 is a block diagram of a video signal processing apparatus employing the three-dot simultaneous sampling method. Components that are the same as those in the first example of the conventional apparatus are denoted by the same reference numerals. The description of the peripheral circuit will be omitted.

The video signal processing apparatus employing the three-dot simultaneous sampling method is used when a frequency band required in a signal processing apparatus is broadened by increasing the number of pixels forming the liquid crystal display panel. In accordance with the three-dot simultaneous sampling method, before a driving process the sub-sampling of video signals are predeterminedly performed so that they are separated, and the processing of low-frequency signals is performed in parallel. Currently, this method is employed in liquid crystal display panels in which one to five hundred thousand pixels of polycrystal silicon are formed.

By referring to FIG. 8, the second example of the video signal processing apparatus will be described.

The video signal processing apparatus in the second example chiefly has an input section 5' to which separate signals such as R, G, and B signals are inputted, a three-channel low-voltage processing circuit 2 which performs processing such as low-voltage-portion controlling of image quality, and a three-channel high-voltage processing circuit 3 which performs signal conversion for a liquid crystal display panel, and the liquid crystal display panel 4.

The low-voltage processing circuit 2 includes, for the three channels, sub-samplers 19a, 19b and 19c, brightness controllers 8a, 8b and 8c for controlling brightness, contrast controllers 9a, 9b and 9c, gamma correctors 10a, 10b and 10c, inverting amplifiers 11a, 11b and 11c, and polarity switches 12a, 12b and 12c.

The high-voltage processing circuit 3 includes AC amplifiers 13a, 13b and 13c, and buffers 14a, 14b and 14c, all of the above corresponding to the three channels. The liquid crystal display panel 4 includes an H-scanner 15 connected to switching devices 17, a V-scanner 16, and a display area 18, as similar to the first example of the conventional apparatus.

The operation of the apparatus in the second example will be described in connection with features thereof.

Separate signals such as R, G, and B signals inputted to the input section 5' in FIG. 8 are inputted to the low-voltage processing circuit 2 having three channels. The sub-samplers 19a, 19b and 19c in the low-voltage processing circuit 2 sub-sample the separate signals so that they are separated into R, G, and B video signals, based on sampling pulses SP (not shown), and outputs the sub-sampled signals to the brightness controllers 8a, 8b and 8c in the next stage. The subsequent operations are the same as those in the conventional apparatus in the first example, which thus will be omitted.

By referring to FIG. 9, a third example of the video signal processing apparatus will be described.

Figure 9:
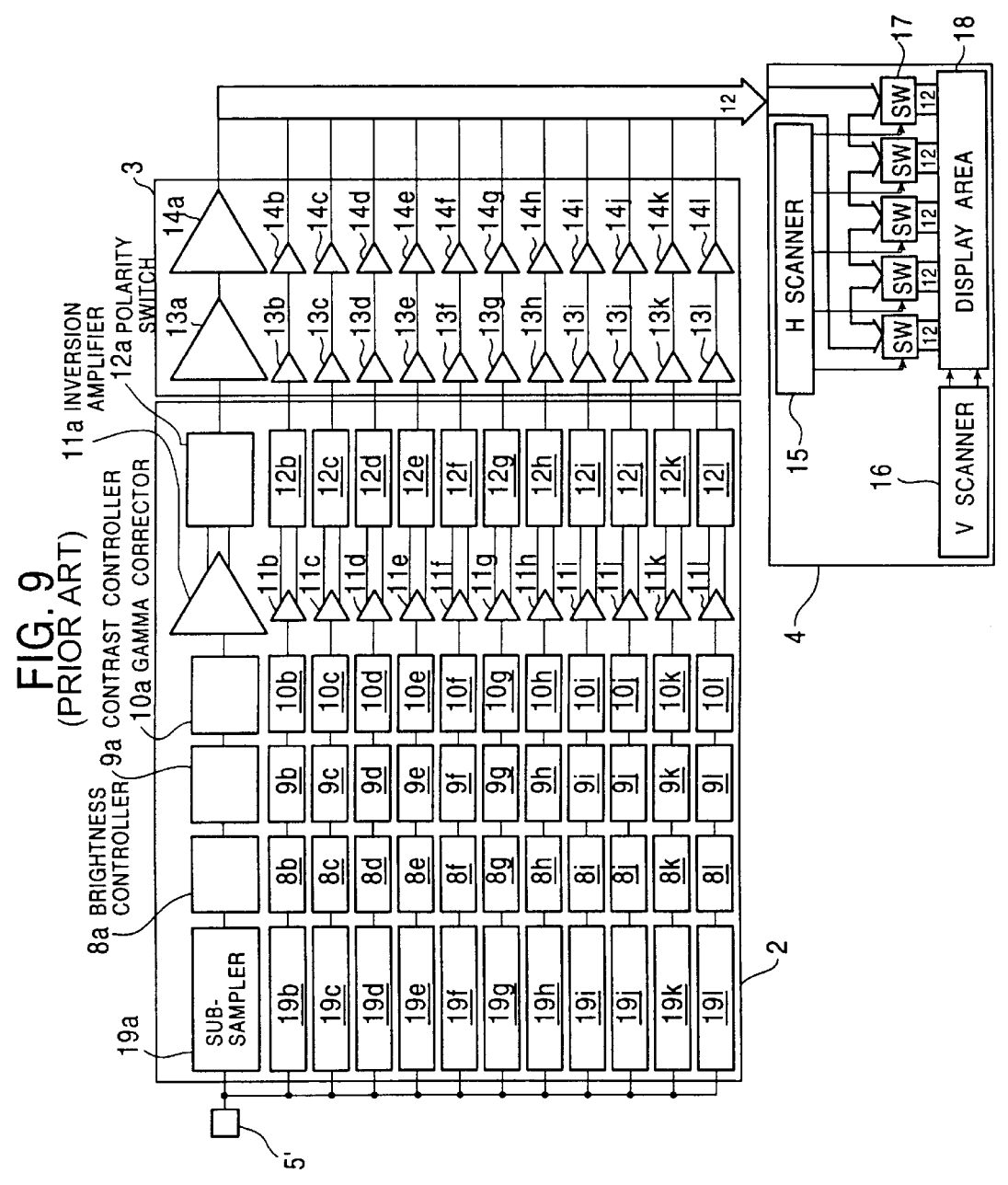

FIG. 9 is a block diagram of a video signal processing apparatus employing the 12-dot simultaneous sampling method.

In the video signal processing apparatus employing the 12-dot simultaneous sampling method, when the number of pixels is further increased compared with the apparatus in the second example, a frequency band required in a video signal processing apparatus becomes further broadened, and as a result, desired frequency characteristics cannot be satisfied by signal separation resulting from the three-dot simultaneous sampling method or the similar method. To this end, the 12-dot simultaneous sampling method in which the number of separated signals is more increased to narrow a frequency band actually required is used.

The apparatus employing the 12-dot simultaneous sampling method chiefly has an input section 5' to which separate signals such as R, G, and B signals are inputted, a low-voltage processing circuit 2 in which processing that includes controlling image quality is performed in low-voltage portions thereof corresponding to twelve channels, a high-voltage processing circuit 3 in which signal conversion is performed corresponding to the twelve channels, and a liquid crystal display panel 4.

The low-voltage processing circuit 2 includes 12-channel sub-samplers 19a to 19l, 12-channel brightness controllers 8a to 8l, 12-channel contrast controllers 9a to 9l, 12-channel gamma correctors 10a to 10l, 12-channel inverting amplifiers 11a to 11l, and 12-channel polarity switches 12a to 12l.

The high-voltage processing circuit 3 includes AC amplifiers 13a to 13l, and buffers 14a to 14l, all of the above corresponding to the twelve channels. The liquid crystal display panel 4 has the same structure as that in the conventional apparatus.

The operation of the apparatus in the third example will be described in connection with features thereof.

Separate signals such as R, G, and B signals inputted to the input section 5' in FIG. 9 are inputted to the low-voltage processing circuit 2 having twelve channels. The sub-samplers 19a to 19l in the low-voltage processing circuit 2 separate video signals such as the R, G, and B signals into twelve portions and output them to the brightness controllers 8a to 8l in the next stage while sub-sampling according to sampling pulses SP (not shown) generated by the timing generator. The subsequent operations are the same as those in the conventional apparatus in the second example, which thus will be omitted.

As described above, as the number of separated signals is increased, the size of circuits becomes enlarged and the number of lines becomes increased in a video signal processing apparatus. For example, if the number of separated signals is multiplied by four as the number of channels is increased from three to twelve, the size of circuits and the number of lines become four times greater. On the other hand, with the increased number of channels, display irregularity such as vertical lines caused by varied characteristics (gains, gamma and so forth) of the respective channels readily occur. In other words, the number of sections to be controlled for suppressing the display irregularity increases, and such controls require considerable time.

SUMMARY OF THE INVENTION

To solve the above problem, the present invention is achieved. It is an object of the present invention to provide a video signal processing apparatus driven by separating a liquid crystal display panel having high resolution and rapid response into a plurality of channels, in which apparatus problems such as enlarged size of the circuits thereof and increased power consumption are solved thereby the size is reduced and the power consumption is suppressed.

In accordance with an aspect of the present invention, the foregoing object is achieved through the provision of a video signal processing apparatus driven by simultaneously sampling a plurality of channels when a video signal is written in a liquid crystal panel, the apparatus including: a low-voltage processing circuit including an image quality controller; and a high-voltage processing circuit to which the output from the low-voltage processing circuit is inputted and for converting the output into a signal to be written in the liquid crystal panel, the low-voltage processing circuit including a first separator which separates a video signal by a first separation number while sampling the video signal to be separated, prior to the image quality controller; and the high-voltage processing circuit including a second separator which separates the output by a second separation number larger than the first separation number.

Preferably, the video signal processing apparatus includes a high-voltage sample-and-hold circuit for receiving and separating the output from the high-voltage processing circuit.

The low-voltage processing circuit may include a first sample-and-hold circuit component corresponding to two channels by setting the first number to two and for sampling a video signal, while the high-voltage processing circuit may include a second sample-and-hold circuit component to which the outputs from the low-voltage processing circuit are inputted, corresponding to twelve channels by setting the second separation number to twelve.

The low-voltage processing circuit may include a first sample-and-hold circuit component corresponding to two channels by setting the first number to two and for sampling a video signal, while the high-voltage processing circuit may include a second sample-and-hold circuit component to which the outputs from the low-voltage processing circuit are inputted, corresponding to six channels by setting the second separation number to six, and wherein the outputs of the second processing circuit component are inputted to the high-voltage sample-and-hold circuit.

The image quality controller may include: a brightness control circuit component for controlling brightness; a contrast control circuit component for controlling contrast; a gamma correction circuit component for controlling gamma correction; and a switching circuit component for selecting the video signal.

The high-voltage processing circuit may include an amplification circuit component and a buffer circuit component.

In accordance with another aspect of the present invention, the foregoing object is achieved through the provision of a video signal processing apparatus driven by simultaneously sampling a plurality of channels when a video signal is written in a liquid crystal panel, the apparatus including: a low-voltage processing circuit including an image quality controller, the low-voltage processing circuit including a first separator which separates a video signal by a first separation number while sampling the video signal to be separated; a high-voltage processing circuit to which the outputs from the low-voltage processing circuit are inputted; and a high-voltage sample-and-hold circuit for receiving the outputs of the high-voltage processing circuit and further separating the outputs.

The image quality controller may include: a brightness control circuit component for controlling brightness; a contrast control circuit component for controlling contrast; a gamma correction circuit component for controlling gamma correction; and a switching circuit component for selecting the video signal.

The high-voltage processing circuit may include: an amplification circuit component; and a buffer circuit component.

The low-voltage processing circuit may include a first sample-and-hold circuit component for sampling a video signal, corresponding to two channels by setting the first separation number to two, and wherein the high-voltage sample-and-hold circuit performs sampling corresponding to twelve channels.

As described above, the video signal processing apparatus of the present invention is provided such that circuits for processing video signals are appropriately separated in accordance with characteristics of the signals in a video signal processing apparatus driven in the plural-dot simultaneous sampling method. Therefore, the present invention can be applied to a video signal processing apparatus that cannot employ the point sequential sampling method because of an increased number of pixels forming a liquid crystal display panel such that the size of circuits and controls therefor, and power consumption are reduced to the necessary minimum range.

BRIEF DESCRIPTION OF THE DRAWINGS

FIG. 9 is a block diagram showing a video signal processing apparatus in which the 12-dot simultaneous sampling method is employed.

DESCRIPTION OF THE PREFERRED EMBODIMENTS

Figure 1:
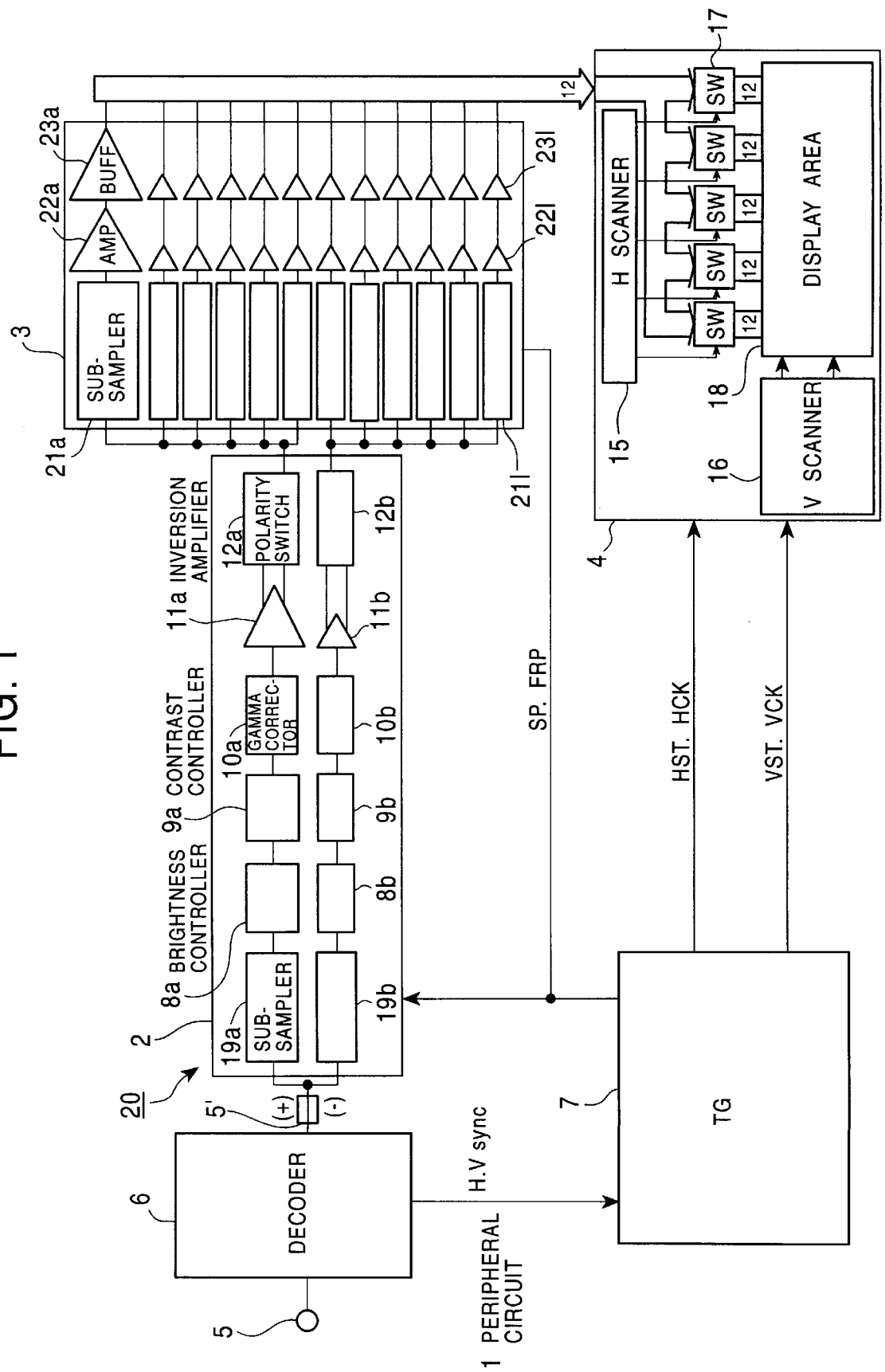
FIG. 1 is a block diagram showing a video signal processing apparatus in accordance with a first embodiment of the present invention.

By referring to the attached drawings, embodiments of the present invention will be described. In the following description, sections that correspond to those in the related art are denoted by the same reference numerals. Explanations of the sections will be partly omitted. Constituent elements are partly shown by abbreviations such as "TG", "AMP", "BUFF", and "SW".

First Embodiment

By referring to FIGS. 1 to 3, a video signal processing apparatus in accordance with a first embodiment of the present invention will be described.

First, by referring to FIGS. 1 to 3, the structure of the apparatus according to the first embodiment will be described.

FIG. 1 is a block diagram of the video signal processing apparatus in accordance with the first embodiment of the present invention. FIG. 2 shows an actual example of sub-sampling and a detailed block diagram of a liquid crystal display panel. FIG. 3 is a timing chart of the operation of the apparatus according to the first embodiment.

In FIG. 1 there is shown the video signal processing apparatus 20 of the present invention. The video signal processing apparatus 20 mainly has a peripheral circuit 1 such as a decoder and a timing generator, a low-voltage processing circuit 2 for controlling image quality, a high-voltage processing circuit 3 for converting signals supplied to a liquid crystal display panel, and the liquid crystal display panel 4.

A feature of the present invention is that signal separation is performed in two stages, in the low-voltage processing circuit 2 and the high-voltage processing circuit 3. In other words, the number of separated signals is reduced in the low-voltage processing circuit 2 working as a small-signal circuit, and the separated signals are further re-separated so as to be final signals just before the high-voltage processing circuit 3 in the next stage. In this embodiment, the low-voltage processing circuit 2 has frequency characteristics enhanced by reducing the number of separated signals to two, while the high-voltage processing circuit 3 has frequency characteristics decreased by increasing the number of separated signals to twelve.

The peripheral circuit 1 includes an input terminal 5 to which a video signal such as a composite video signal is input, a decoder 6 for converting the input video signal into separate R, G, and B signals or the like, and a timing generator for generating various control signals.

The low-voltage processing circuit 2 includes two sets of units: sub-samplers 19a and 19b, brightness controllers 8a and 8b provided with control means for controlling brightness, contrast controllers 9a and 9b, gamma correctors 10a and 10b, inverting amplifiers 11a and 11b, and polarity switches 12a and 12b.

The high-voltage processing circuit 3 has twelve sets of units: sub-samplers 21a to 21l, AC amplifiers 22a to 22l, and buffers 23a to 23l. A plurality of video signals separated by the high-voltage processing circuit 3 are sent to the liquid crystal display panel 4 for monochrome or color display.

The liquid crystal display panel 4 includes an H-scanner 15 including gate circuits and sample-and-hold circuits, and a V-scanner 16 including enable gates and buffers. The H-scanner 15 is connected to signal lines as described below through switching devices 17, while the V-scanner 16 is connected to scanning lines (not shown), and the signal lines and the scanning lines are arranged in a matrix. TFTs are formed on the points where the signal lines and the scanning lines intersect with each other, which form a display area 18.

Figure 2:
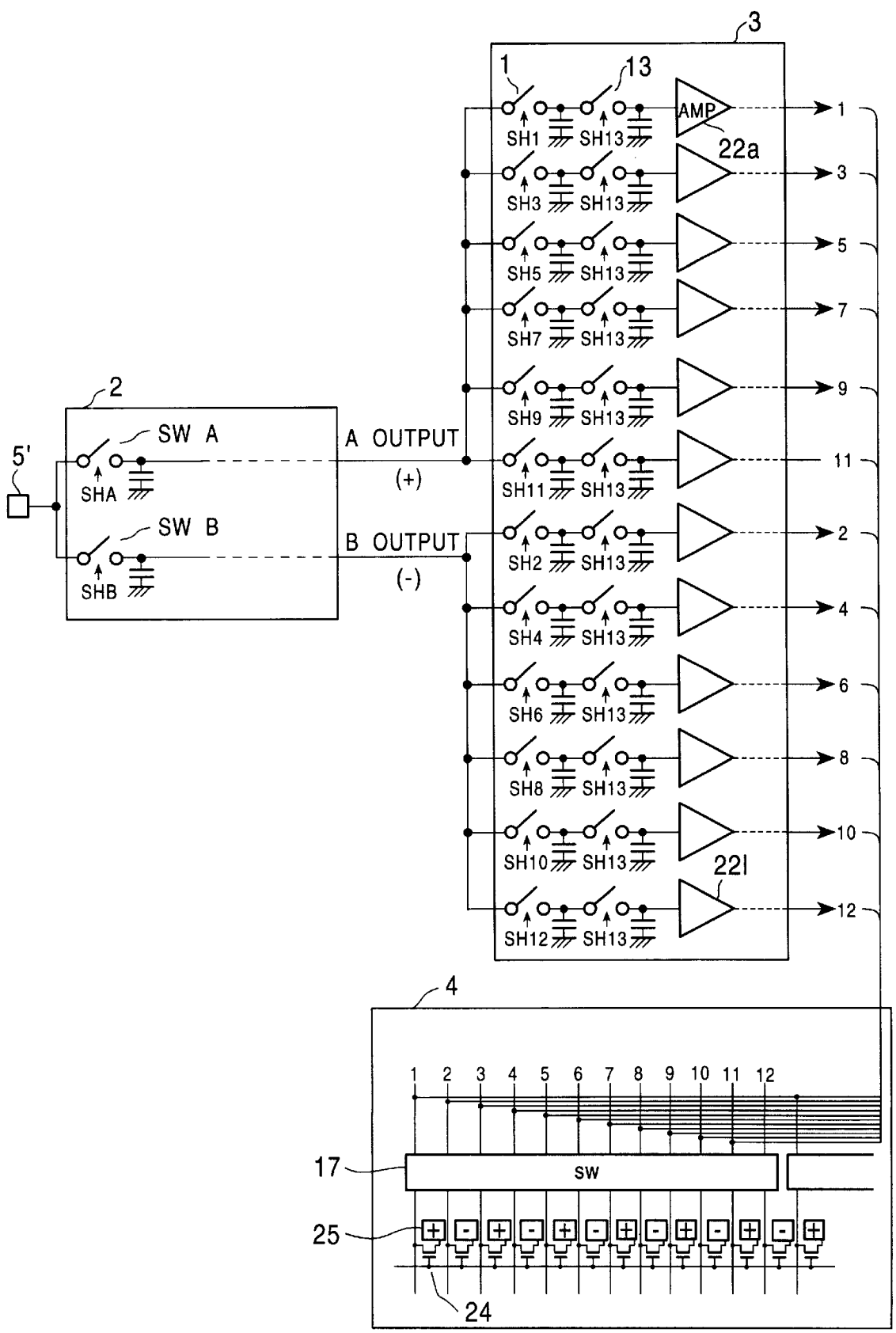
FIG. 2 is a block diagram showing an actual example of sub-sampling and the detailed structure of a liquid crystal display panel according to embodiment of the present invention.

As shown in FIG. 2, a predetermined color signal is separated into two signals in this embodiment. By way of example, a red video signal is inputted to an input section 5', and the sub-sampler in the low-voltage processing circuit 2 includes a switch A that is switched by a control signal SHA and a switch B that is switched by a control signal SHB. The high-voltage processing circuit 3 includes switches 1 to 13 for switching signals corresponding to twelve channels in accordance with control signals SH1 to SH13. The respective switches are connected to storing capacitors and AC amplifiers 22a to 22l. Video signals separated corresponding to channels 1 to 12 are sent the liquid crystal display panel 4 through its signal lines 1 to 12, and are further sent to TFTs 24 and pixels 25 through the switching devices 17.

By referring to FIGS. 1 to 3, the operation of the apparatus in this embodiment will be described.

A video signal such as a composite video signal that is inputted to the input terminal 5 in FIG. 1 is inputted into the decoder 6. The decoder 6 converts the video signal into separate signals to be adapted for the liquid crystal display panel, and, for example, outputs positively and negatively-inverted red video signals to the output section 5'. The decoder 6 further outputs synchronizing signals Hsync and Vsync to the timing generator 7 after separating them from the video signal. The timing generator 7 generates control signals, such as sampling pulses SP used for controlling the liquid crystal display panel, start pulses HST and VST, and clock pulses HCK and VCK, from a VCO and synchronizing signals Hsync and Vsync, and outputs the resulting signals to the low-voltage processing circuit 2, the high-voltage processing circuit 3, and the liquid crystal display panel 4.

The sub-samplers 19a and 19b in the low-voltage processing circuit 2 perform sampling based on the sampling pulses SP outputted from the timing generator 7. The brightness controllers 8a and 8b, the contrast controllers 9a and 9b, and a gamma correctors 10a and 10b control brightness, contrast, and a gamma correction curve, respectively, by controlling control means thereof as not shown. The inverting amplifiers 11a and 11b amplify inverted video signals. The polarity switches 12a and 12b select video signals having predetermined polarities from the inverted video signals amplified, and output them.

The sub-samplers 21a to 21l in the high-voltage processing circuit 3 re-sample the inputted video signals having the predetermined polarities, based on the sampling pulses SP. The AC amplifiers 22a to 22l amplify the re-sampled video signals up to a predetermined level. The buffers 23a to 23l performs processing that includes electric current amplification in connection with the amplified video signals in order to drive the liquid crystal display panel 4 as a load.

The liquid crystal display panel 4 receives video signals for the twelve channels corresponding to the respective pixels, inputted from the above-described video signal processing apparatus, and the control signals such as HST, HCK, VST, and VCK, and supplies them to the H-scanner 15 and the V-scanner 16. The V-scanner 16 sequentially selects one of the scanning lines at each one horizontal period, while the H-scanner 15 sequentially selects one of the switching devices 17 at each one horizontal period. The video signals are taken into signal lines through the switching devices 17. The video signals taken into the lines control the molecules (not shown) of the liquid crystal using the TFTs in accordance with the video levels of the respective pixels so that the molecules are twisted to be tilted in the direction in which the voltage is applied, thereby an image is displayed on the display area 18.

By referring to FIGS. 2 and 3, the detailed operation of the first embodiment will be described.

In the low-voltage processing circuit 2 in FIG. 2, a video signal inputted to the input section 5', for example, a red video signal, is inputted to both switches A and B. The switches A and B switch video signals based on the control signals SHA and SHB, and output the video signals with predetermined polarities to outputs A and B.

Figure 3:
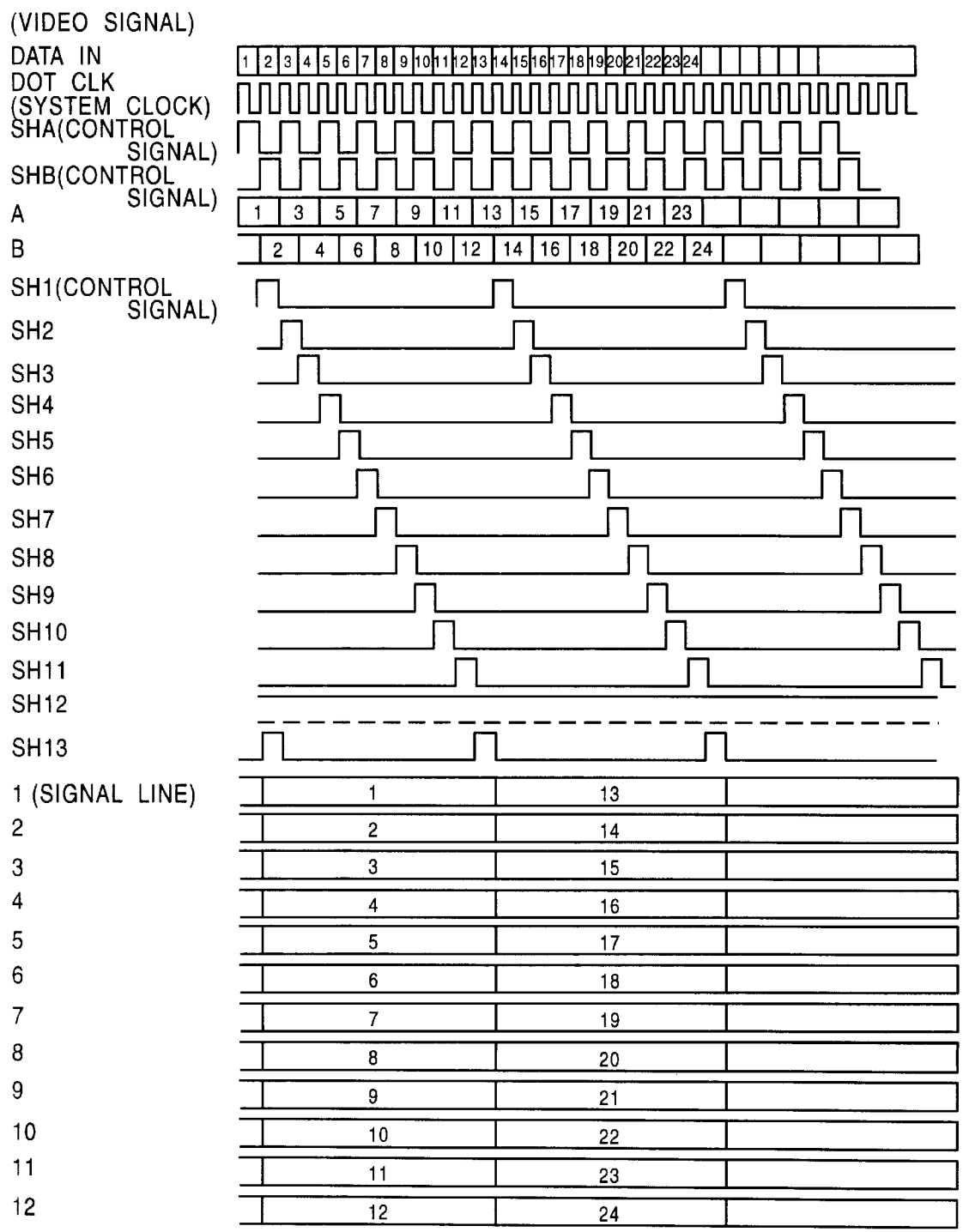
FIG. 3 is a timing chart showing the operation of the video signal processing apparatus in accordance with the first embodiment of the present invention.

By referring to FIG. 3, the video signals (video data) 1 to 24 are switched by the control signals SHA and SHB that have a dot clock (system clock) as a reference, so that, for example, positive video signals 1 to 23 and negative video signals 2 to 24 that have been switched are outputted to the outputs A and B, as shown. The video signals with polarities positively and negatively inverted, outputted to the outputs A and B are outputted to the high-voltage processing circuit 3 in FIG. 2. The switches 1 to 13 in the high-voltage processing circuit 3 are controlled by control signals SH1 to SH13 in FIG. 3. The control signals SH1 to SH13 are shift clocks corresponding to one signal line as shown in FIG. 3. The video signals controlled by the control signals SH1 to SH13 are outputted to the liquid crystal panel 4 through the AC amplifiers 22a to 22l in the high-voltage processing circuit 3 in FIG. 2. The video signals processed by the high-voltage processing circuit 3 are inputted into the signal lines 1 to 12 of the liquid crystal display panel 4 in FIG. 2, and are inputted to the TFTs 24 and the pixels 25 through the switching devices 17.

In accordance with this embodiment, a small number of divisions can be used because the low-voltage processing circuit 2 is a small-signal circuit. If processing in the low-voltage processing circuit 2 is performed by a digital signal processor, it can be sufficiently achieved with the system clock suppressed to about 50 MHz. The high-voltage processing circuit 3 in the next stage further re-separates the separated signals to decrease driving frequency characteristics. Thereby, a sufficient high voltage is maintained in the high-voltage processing circuit 3.

Second Embodiment

This embodiment is concerned with a three-stage processing in place of the two-stage processing according to the first embodiment. This will be described by referring to FIG. 4. However, explanation of the peripheral circuit will be omitted.

First, by referring to FIG. 4 a second embodiment of the present invention will be described.

Figure 4:
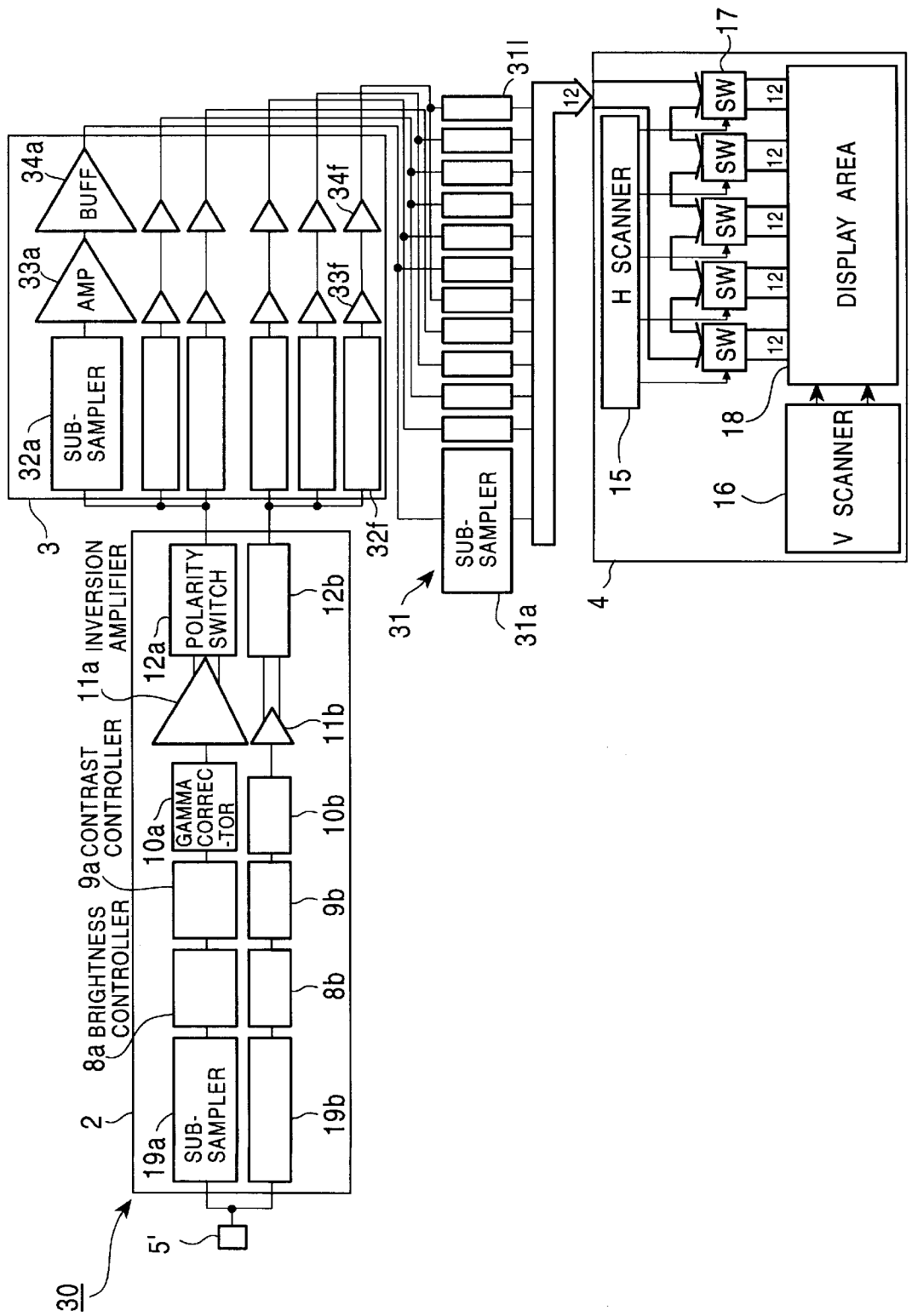
FIG. 4 is a block diagram showing a video signal processing apparatus in accordance with a second embodiment of the present invention.

FIG. 4 is a block diagram of a video signal processing apparatus in accordance with the second embodiment of the present invention.

The video signal processing apparatus of the present invention is denoted by a reference numeral 30 in FIG. 4. The video signal processing apparatus 30 mainly has an input section 5' to which predetermined color signals, e.g., red video signals with polarities positively and negatively inverted are inputted, a low-voltage processing circuit 2, a liquid crystal display panel 4, and a high-voltage processing circuit 3 for converting into signals for the liquid crystal display panel.

A feature of the present invention is that signal separation is performed in three stages by further providing a high-voltage sample-and-hold circuit 31 in addition to the low-voltage processing circuit 2 and the high-voltage processing circuit 3. In this embodiment, frequency characteristics are decreased such that the number of signals separated by the low-voltage processing circuit 2 is set to two, and the number of signals separated by the high-voltage processing circuit 3 is set to six, with the number of signals separated by the high-voltage sample-and-hold circuit 31 increased to twelve.

The low-voltage processing circuit 2 includes two sets of units: sub-samplers 19a and 19b, brightness controllers 8a and 8b, contrast controllers 9a and 9b, gamma correctors 10a and 10b, inverting amplifiers 11a and 11b, and polarity switches 12a and 12b.

The high-voltage processing circuit 3 includes six sets of units: sub-samplers 32a to 32f, AC amplifiers 33a to 33f, and buffers 34a to 34f. Six separated video signals are sent to the high-voltage sample-and-hold circuit 31.

The high-voltage sample-and-hold circuit 31 includes, sub-samplers 31a to 31l connected to the respective signal lines of the liquid crystal display panel 4. Twelve video signals separated by the high-voltage sample-and-hold circuit 31 are sent to the liquid crystal display panel 4. The liquid crystal display panel 4 has the same structure as that in the first embodiment.

The operation of the apparatus according to this embodiment will be described, in connection with features thereof.

Video signals, e.g., video signals with polarities positively and negatively inverted, inputted to the input section 5' are inputted to the low-voltage processing circuit 2. The sub-samplers 19a and 19b in the low-voltage processing circuit 2 perform sampling, based on sampling pulses SP (not shown). The brightness controllers 8a and 8b, the contrast controllers 9a and 9b, and gamma correctors 10a and 10b use control means as not shown to control brightness, contrast, a gamma correction curve, respectively. The inverting amplifiers 11a and 11b amplify video signals. The polarity switches 12a and 12b select video signals having predetermined polarities from the amplified signals, and output them to the high-voltage processing circuit 3.

The sub-samplers 32a to 32f in the high-voltage processing circuit 3 perform re-sampling the inputted video signals having the predetermined polarities, based on the sampling pulses SP. The AC amplifiers 33a to 33f amplify the sub-sampled video signals up to a predetermined video level. The buffers 34a to 34f amplify the electric currents of the amplified video signals in order to drive the load in the next stage, and output the resulting signals to the high-voltage sample-and-hold circuit 31. The high-voltage sample-and-hold circuit 31 separates the output signals to, for example, twelve signals corresponding to twelve channels, based on the sampling pulses SP. At the same time, the sub-samplers 31a to 31l perform sub-sampling the separated signals, and output the sub-sampled signals to the liquid crystal display panel 4. The liquid crystal display panel 4 displays an image in accordance with a conventional manner.

In this embodiment, video signal separation is performed in three stages. A video signal is separated into two, similar to the first embodiment, in the low-voltage processing circuit. The separated signals are re-separated into a small number of signals such as six signals, and they are finally re-separated again just before the high-voltage sample-and-hold circuit (analog switches) connected to the signal lines of the liquid crystal display panel. In accordance with such a manner, signal separation performed in stages reduces the size of the circuits to the minimum, and implements a video signal processing apparatus whose controls are reduced to the minimum.

Third Embodiment

This embodiment is a modification of the apparatus according to the second embodiment in which signal separation is performed in three stages. In a video signal processing apparatus according to this embodiment, the re-separation of video signals is not performed by a high-voltage processing circuit, but it is done by a high-voltage sample-and-hold circuit placed just before a liquid crystal display panel. This will be described by referring to FIGS. 5 and 6.

By referring to FIGS. 5 and 6, the apparatus according to the third embodiment will be described.

Figure 5:
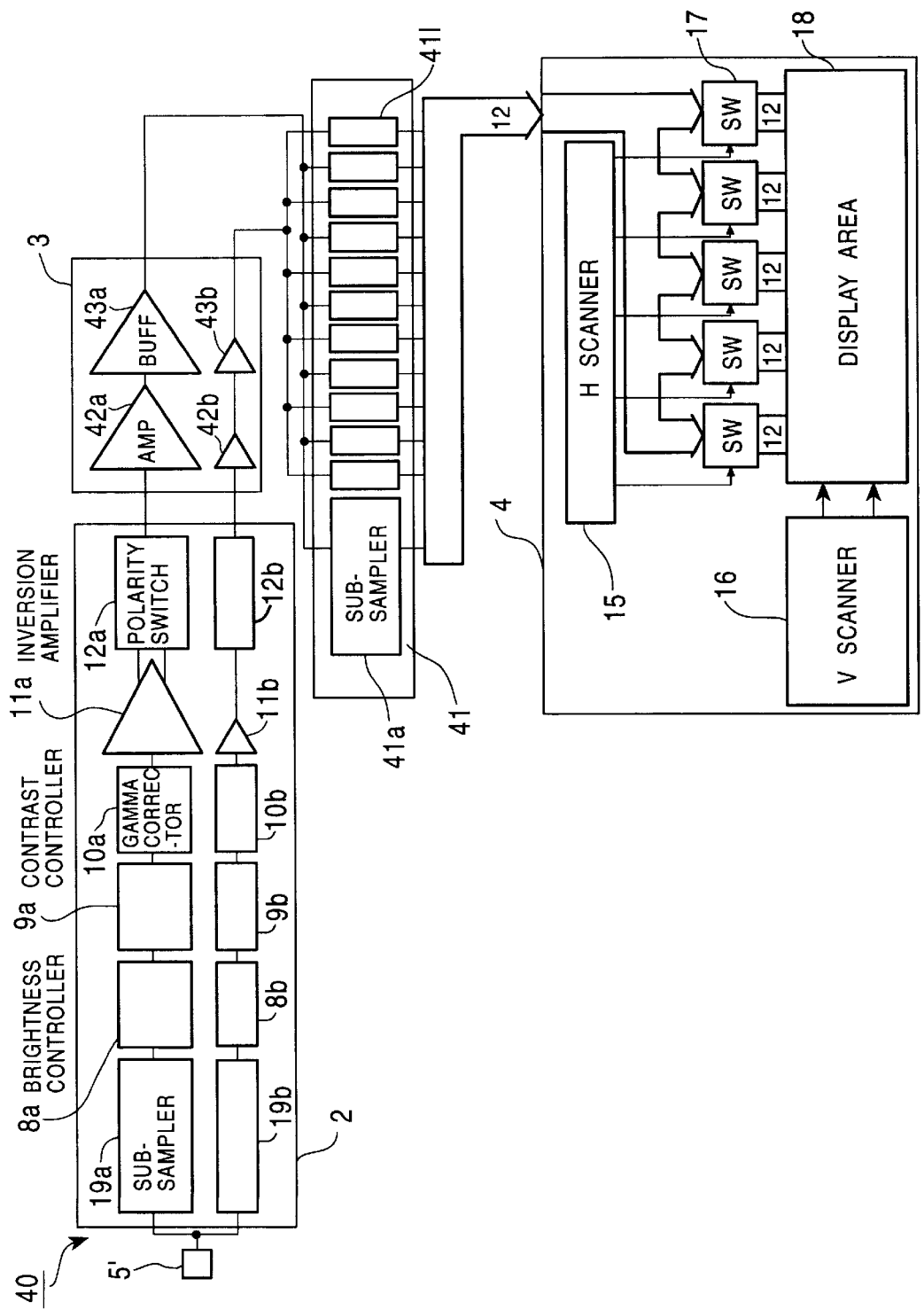
FIG. 5 is a block diagram showing a video signal processing apparatus in accordance with a third embodiment of the present invention.

FIG. 5 is a block diagram of the video signal processing apparatus according to the third embodiment of the present invention. FIG. 6 shows an actual example of sub-sampling and a detailed block diagram of the liquid crystal display panel.

In FIG. 5, the video signal processing apparatus according to this embodiment mainly has an input section 5', a low-voltage processing circuit 2 that is separated into two sections, a high-voltage processing circuit 3 that is similarly separated into two sections, a high-voltage sample-and-hold circuit 41, and a liquid crystal display panel 4.

In this embodiment, frequency characteristics are enhanced by reducing the number of separated video signals to two in both the low-voltage processing circuit 2 and the high-voltage processing circuit 3. On the other hand, frequency characteristics are decreased by increasing the number of separated video signals to twelve in the high-voltage sample-and-hold circuit 41 placed just before the liquid crystal display panel 4, whereby sufficient voltages are maintained.

The low-voltage processing circuit 2 includes two sets of units: sub-samplers 19a and 19b, brightness controllers 8a and 8b provided with control means, contrast controllers 9a and 9b, gamma correctors 10a and 10b, inverting amplifiers 11a and 11b, and polarity switches 12a and 12b. The high-voltage processing circuit 3 includes two sets of units: AC amplifiers 42a and 42b, and buffers 43a and 43b. The high-voltage sample-and-hold circuit 41 includes twelve separated sub-samplers 41a to 41l, the outputs of which are sent to the signal lines of the liquid crystal display panel 4. The liquid crystal display panel 4 has a structure as described above.

Figure 6:
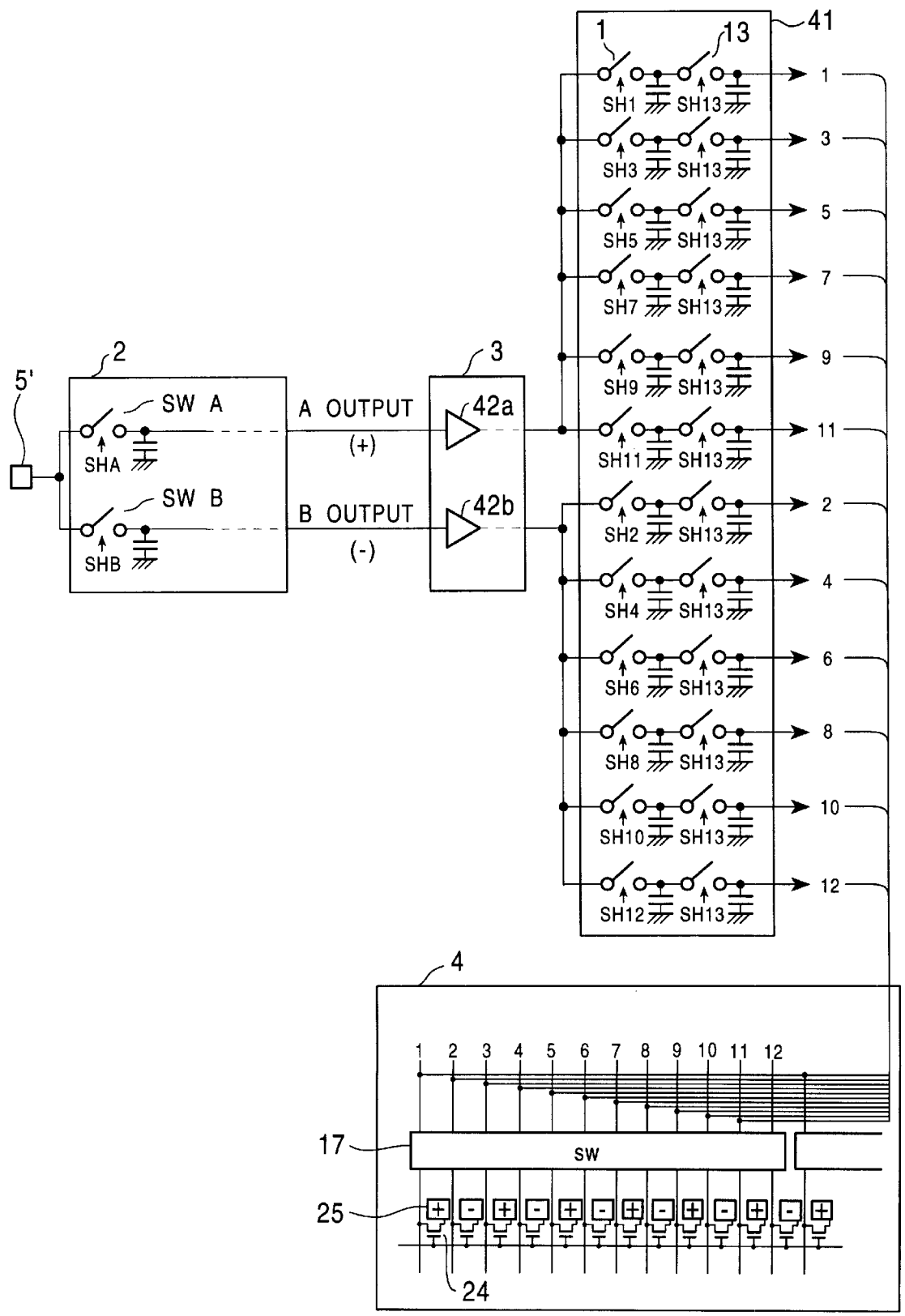
FIG. 6 is a block diagram showing an actual example of sub-sampling and the detailed structure of a liquid crystal display panel in the third embodiment of the present invention.
Figure 7:
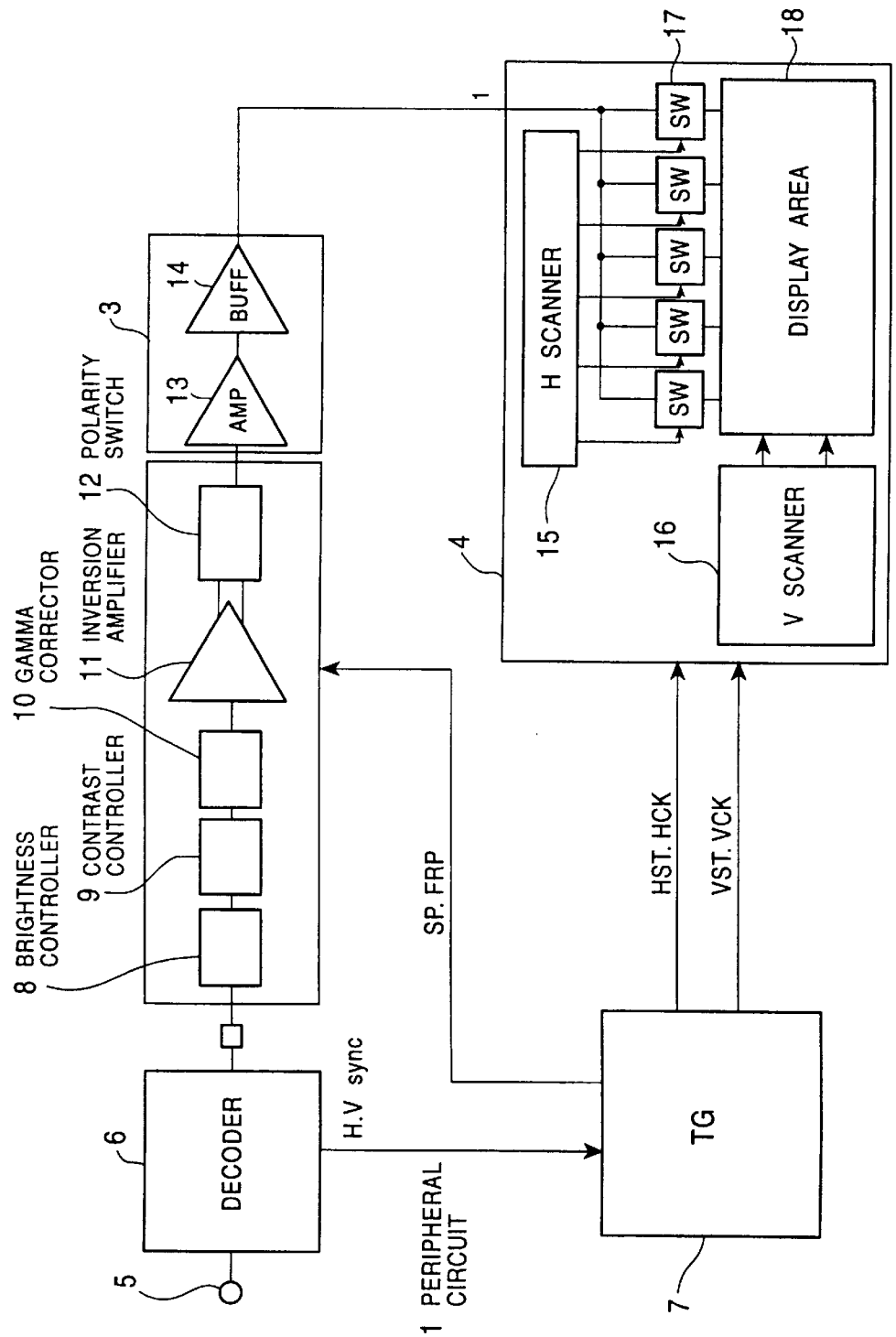
FIG. 7 is a block diagram showing a video signal processing apparatus in which the point sequential sampling method is employed.
Figure 8:
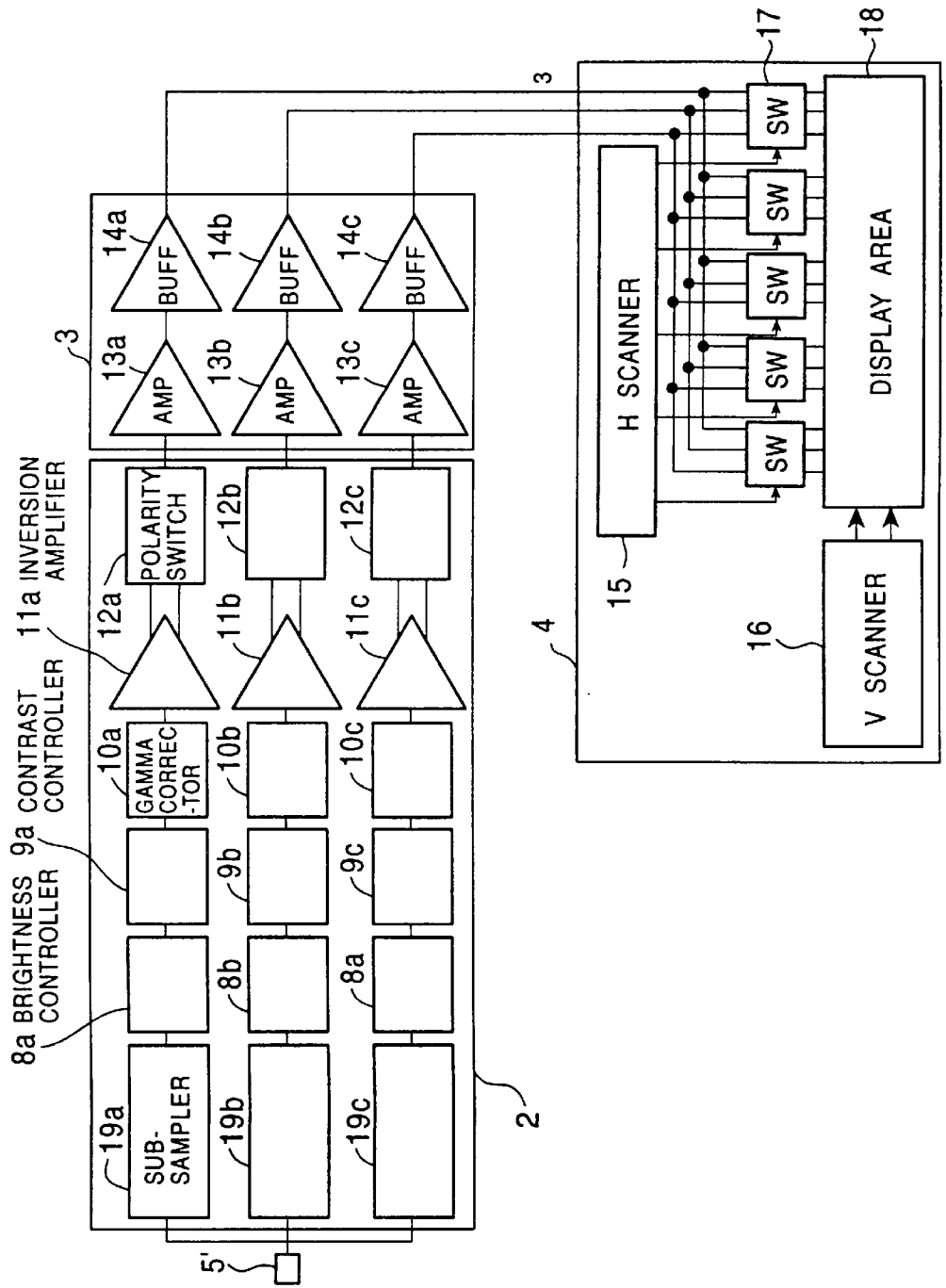
FIG. 8 is a block diagram showing a video signal processing apparatus in which the three-dot simultaneous sampling method is employed.

According to the detailed block diagram shown in FIG. 6, for example, a red video signal is inputted to the input section 5', and the low-voltage processing circuit 2 includes switches A and B that are switched by control signals SHA and SHB. The outputs of the low-voltage processing circuit 2 are sent to the high-voltage processing circuit 3 through A-output and B-output lines. The outputs of the high-voltage processing circuit 3 are sent to the high-voltage sample-and-hold circuit 41. The high-voltage sample-and-hold circuit 41 includes switches 1 to 13 for switching signals corresponding to twelve channels in accordance with control signals SH1 to SH13. The respective switches are connected to storing capacitors. Twelve video signals separated by the respective switches are sent to the signal lines 1 to 12 of the liquid crystal display panel 4, and further sent to TFTs 24 and pixels 25 through switching devices 17.

By referring to FIG. 5, the operation of the apparatus according to this embodiment will be described.

In FIG. 5, video signals inputted to the input section 5' are inputted to the low-voltage processing circuit 2. The sub-samplers 19a and 19b in the low-voltage processing circuit 2 perform sampling, based on sampling pulses SP (not shown) outputted from a timing generator. The brightness controllers 8a and 8b, contrast controllers 9a and 9b, and gamma correctors 10a and 10b use control means to control brightness, contrast, and a gamma correction curve, respectively. The inverting amplifiers 11a and 11b amplify the video signals. The polarity switches 12a and 12b select video signals having predetermined polarities from the amplified signals and output them.

The AC amplifiers 42a and 42b in the high-voltage processing circuit 3 amplify the sub-sampled video signals for dot-inversion up to a predetermined level. The buffers 43a and 44b perform processing including electric current amplification in connection with the signals in order to drive a load in the subsequent-stage circuit. The sub-samplers 41a to 41l in the high-voltage sample-and-hold circuit 41 perform re-sampling the inputted video signals having the predetermined polarities, based on sub-sampling pulses SP (not shown), and output the re-sampled signals to the signal lines of the liquid crystal display panel 4. The liquid crystal display panel 4 displays an image in accordance with a conventional manner.

By referring further to FIG. 6, the detailed operation of the apparatus according to this embodiment will be described.

The low-voltage processing circuit 2 alternatively switches inputted video signals having positively and negatively inverted polarities, by using the switches A and B, based on the control signals SHA and SHB, and outputs video signals having predetermined polarities. The high-voltage processing circuit 3 performs the amplification and buffering of the video signals. The high-voltage sample-and-hold circuit 41 performs the switching of the videos signals. In other words, the video signals having inverted polarities inputted to the high-voltage sample-and-hold circuit 41 are switched by the switches 1 to 13, based on the control signals SH1 to SH13, and outputted, as twelve separated video signals, to the signal lines of the liquid crystal display panel 4. A timing chart showing the operation of the apparatus in this embodiment is the same as that in the first embodiment, and subsequent operations are also the same, the description of which will be omitted.

In accordance with this embodiment, the number of separated signals is reduced in both the low-voltage processing circuit 2 and the high-voltage processing circuit 3, and the separated signals are further re-separated just before the high-voltage sample-and-hold circuit 41. Thereby, the size of circuits and the number of lines can further be reduced, and a video signal processing apparatus in which sufficient high voltages are maintained can be provided.

The present invention is not limited to the above-described embodiments, but can be modified to various modes. As described, the above embodiments are concerned with means in which the number of separated video signals is set to three to twelve. However, the number of separated video signals can be increased, and thus, the number of the signals does not limit the scope of the present invention. On the other hand, although the driving circuits of the H-scanner and the V-scanner are provided in the apparatus in the above embodiments, the present invention can be applicable to the case in which the driving circuits are provided outside the apparatus. Further, it does not need saying that the present invention can be applicable within the spirit thereof.

What is claimed is:

1. A video signal processing apparatus driven by simultaneously sampling a plurality of channels of a video signal to produce resultant signal samples to be written to a liquid crystal panel having a display area and horizontal and vertical display drive circuits for distributing the resultant signal samples to said display area, said apparatus including:

a low-voltage processing circuit having a plurality of first outputs and having an image quality controller, said low-voltage processing circuit including a first separator which separates said video signal by a first separation number, said plurality of first outputs being equal to said first separation number; and a high-voltage processing circuit to which said first outputs are inputted and for converting said first outputs into a plurality of second outputs to be written to said liquid crystal panel as said resultant signal samples, said high voltage processing circuit including a second separator which separates said first outputs by a second separation number larger than said first separation number said plurality of second outputs being equal to said second separation number.

2. A video signal processing apparatus according to claim 1, further including a high-voltage sample-and-hold circuit for receiving and separating said second outputs from said high-voltage processing circuit.

3. A video signal processing apparatus according to claim 1, wherein said low-voltage processing circuit includes a first sample-and-hold circuit component having first and second channels by setting the first separation number to two and for sampling a video signal, while said high-voltage processing circuit includes a second sample-and-hold circuit device, to which the first outputs from said low-voltage processing circuit are inputted, corresponding to twelve channels by setting said second separation number to twelve.

4. A video signal processing apparatus according to claim 2, wherein said low-voltage processing circuit includes a first sample-and-hold circuit component having first and second channels for sampling a video signal, while said high-voltage processing circuit includes a second sample-and-hold circuit component, to which said first outputs from said low-voltage processing circuit are inputted, corresponding to six channels by setting said second separation number to six, and wherein said second outputs of said second high-voltage processing circuit are inputted to said high-voltage sample-and-hold circuit.

5. A video signal processing apparatus according to claim 1, wherein said image quality controller includes:

a brightness control circuit component for controlling brightness;

a contrast control circuit component for controlling contrast;

a gamma correction circuit component for controlling gamma correction; and a switching circuit component for selecting said video signal.

6. A video signal processing apparatus according to claim 1, wherein said high-voltage processing circuit includes an amplification circuit component and a buffer circuit component.

7. A video signal processing apparatus driven by simultaneously sampling a plurality of channels of a video signal to produce resultant signal samples to be written to a liquid crystal display having a display area and horizontal and vertical display drive circuits for distributing the resultant signal samples to said display area, said apparatus including:

a low-voltage processing circuit including an image quality controller that generates a plurality of first outputs, said low-voltage processing circuit including a first separator which separates said video signal by a first separation number, said plurality of first outputs being equal to said first separation number;

a high-voltage processing circuit to which said first outputs are inputted, said high-voltage processing circuit generating a plurality of second outputs; and a high-voltage sample-and-hold circuit for receiving said second outputs and separating said second outputs by a second separation number larger than said first separation number to generate a plurality of third outputs being equal to said second separation number to be written to said liquid crystal panel as said resultant signal samples.

8. A video signal processing apparatus according to claim 7, wherein said image quality controller includes:

a brightness control circuit component for controlling brightness;

a contrast control circuit component for controlling contrast;

a gamma correction circuit component for controlling gamma correction; and a switching circuit component for selecting said video signal.

9. A video signal processing apparatus according to claim 7, wherein said high-voltage processing circuit includes:

an amplification circuit component; and a buffer circuit component.

10. A video signal processing apparatus according to claim 7, wherein said low-voltage processing circuit includes a first sample-and-hold circuit component for sampling said video signal, corresponding to two channels by setting said first separation number to two, and wherein said high-voltage sample-and-hold circuit performs sampling corresponding to twelve channels.

* * * * *